United States Patent [19]

Doolittle

[11] 4,064,967
[45] Dec. 27, 1977

[54] STEERING MECHANISM

[75] Inventor: Mac R. Doolittle, Charlotte, Mich.

[73] Assignee: Clark Equipment Company, Buchanan, Mich.

[21] Appl. No.: 707,961

[22] Filed: July 23, 1976

[51] Int. Cl.² .......................... B62D 5/10; B62D 7/10
[52] U.S. Cl. .................................. 180/155; 280/95 R
[58] Field of Search ............... 180/154, 155, 156, 157, 180/159, 160; 280/95 R, 93, 103

[56] References Cited

U.S. PATENT DOCUMENTS

| 2,095,566 | 10/1937 | Lundelius et al. | 280/95 R |
| 2,191,961 | 2/1940 | Howell | 280/95 R |
| 2,609,216 | 9/1952 | McEhinney et al. | 280/103 |
| 3,480,100 | 11/1969 | Gaulke | 280/95 R |
| 3,768,585 | 10/1973 | Mall | 280/95 R |

FOREIGN PATENT DOCUMENTS 715,810  9/1954  United Kingdom ............. 280/95 R

Primary Examiner—Joseph F. Peters, Jr.
Assistant Examiner—John A. Pekar
Attorney, Agent, or Firm—John C. Wiessler

[57] ABSTRACT

A steering mechanism for use in a vehicle, such as an industrial truck or the like, in which a two-way power steering actuator cylinder having a piston rod extending from both ends is supported from and above a steering axle by pivot tube and pivot shaft members which enable universal movement of the steering cylinder, the piston rod functioning also as a tie rod which is connected at each opposite end to a modified four-bar steering linkage which is in turn connected to a dirigible wheel. King post assemblies are secured to opposite ends of the steer axle which connect the four-bar linkages to the wheels. Each such linkage includes a steering link extended in length to connect the adjacent end of the actuator piston rod. One end of a guide link of the four-bar linkage is connected to the steering link intermediate the ends thereof.

20 Claims, 8 Drawing Figures

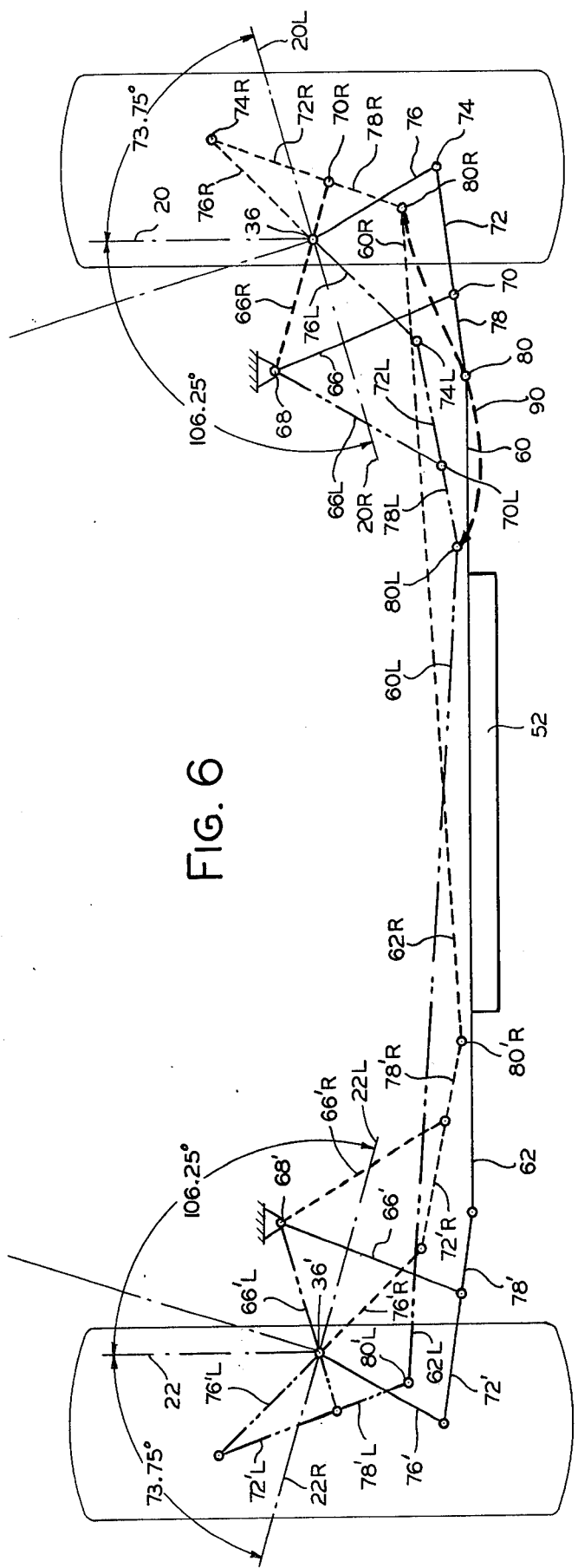

STEERING MECHANISM

BACKGROUND OF THE INVENTION

The field of art of which the invention pertains includes steering mechanism, and more specifically steering mechanism for industrial lift trucks and other vehicles.

Prior steering mechanisms, particularly for vehicles of the type primarily contemplated, have more or less successfully coped with several problems inherent in the design of such mechanisms, and predictably there have been several prior design approaches.

One of the problems encountered and not fully resolved heretofore has concerned the provision of a steering geometry in a four wheeled vehicle capable, within a relatively confined space, of producing substantially ideal differential steering angles as between the dirigible wheels through a very wide range of angular movement of the wheels, such as 180° from a full right cramp to a full left cramp position thereof. A typical prior steering mechanism for a lift truck using a four-bar linkage design is disclosed in Howell U.S. Pat. No. 2,191,961, which includes a rather full explanation of the theory of differential angular steering such that the wheels roll with relatively little lateral slip or scuffing during turning maneuvers of the truck.

Another problem has been to provide in the limited space ordinarily available for steering such trucks a steering linkage and tie bar assembly which is effective with a relatively small variation in actuator force to turn the steering wheels to a high angle full cramp position. Heretofore the effective turning moment arm has approached a very small value at high maximum steering angles in conventional four-bar steering mechanisms, thereby requiring either a relatively large range of actuator force or a substantial limitation on steering angle. Prior steering mechanisms of the type contemplated have not been available to provide 180° steering angles combined with accurate steering geometry.

While some prior steering axles, such as shown in Gaulke U.S. Pat. No. 3,480,100 and Matteo U.S. Pat. No. 3,768,585, have utilized a combination power actuator and tie rod construction, they are unable to effect 180° wheel swing with accurate steering geometry in a relatively small space.

SUMMARY OF THE INVENTION

My invention provides an extremely novel modification in four-bar linkage steering devices which involves the extension of a steering link element to a point of connection with a tie rod element which is beyond the point of connection of the steering link with a guide link of the four-bar linkage. It also provides a steering assembly mounted in generally inverted U-shaped configuration around a steering axle, which includes an actuator cylinder and tie rod mounted for pivotal movement about vertical and transverse horizontal axes.

A number of important advantages are effected by my invention as follows:

1. Improved steering geometry effecting minimum variation from theoretically ideal differential steering in 180° steer angle assembly for a four wheel vehicle;
2. Less variation in steering linkage actuator force requirements which in turn makes possible the use of both a smaller diameter actuator cylinder for any given maximum hydraulic pressure, and of a lighter design of the steering linkage. These advantages result because both the linkage and the actuator must be designed to resist maximum force, not average force;
3. A combined tie rod and actuator cylinder mounted as a single unit above the steer axle and connected to the steering linkage in such a manner that combined pivotal movements thereof occur during steering maneuvers, the said movements being relatively small as a result of the improved four-bar linkage geometry which further results in minimizing any off-center thrust forces on the packing of the cylinder;
4. Improved universal pivotal mounting of actuator and tie rod.

It is therefore a primary object of the present invention to provide improved steering geometry, steering structure, and mounting structure for steering actuator means in vehicles of the type contemplated.

Additional objects, features and advantages of the invention will become apparent from the following description and accompanying drawings.

BRIEF DESCRIPTION OF THE DRAWING

FIG. 6 is a diagram showing the relative positions of the main elements of the steering linkage in both straight-ahead, left full turn and right full turn positions;

FIG. 8 is a chart which illustrates differences of actuator forces required at different steering angles for representative steering mechanisms using (1) my invention, (2) a standard four-bar linkage, and (3) a theoretically perfect linkage.

DESCRIPTION OF THE PREFERRED EMBODIMENT

Figure 1:
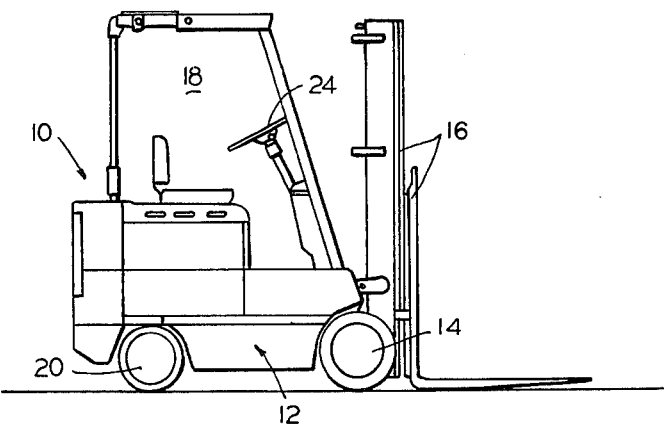
FIG. 1 is a side view of a lift truck exemplary of one type of vehicle with which my invention may be used.
Figure 4:
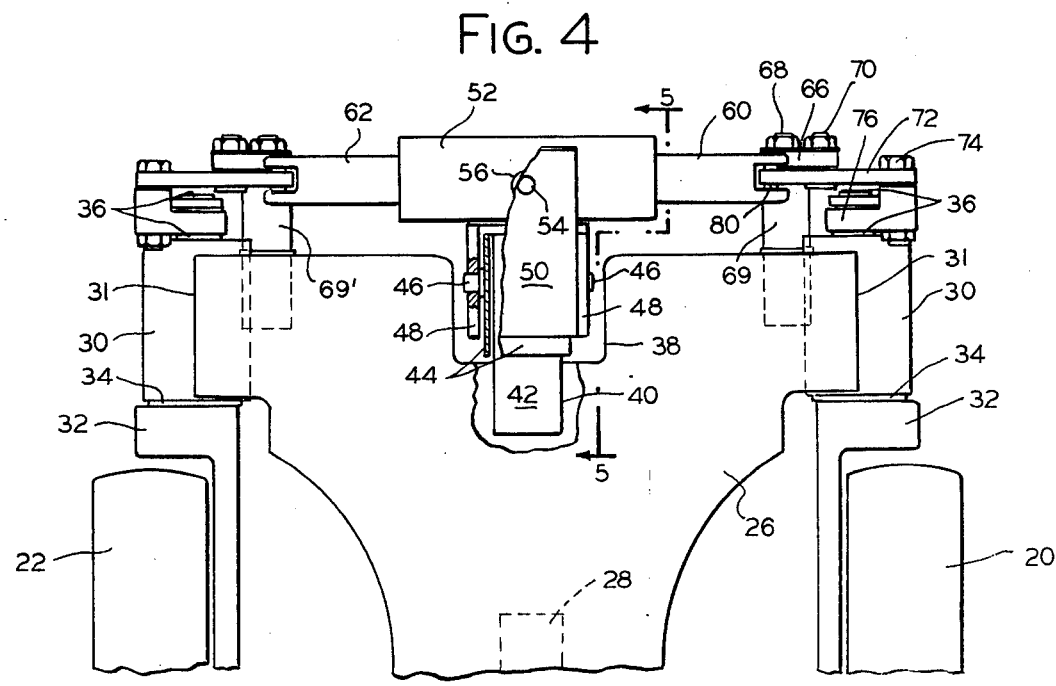
FIG. 4 is a rear view of the mechanism as shown in FIG. 2.

An exemplary vehicle with which my invention may be used is shown in FIG. 1 as an industrial lift truck 10 having a main body and chassis 12 enclosing a prime mover, drive, and control means which may comprise a hydrostatic or electric system, for example, for driving a pair of drive wheels 14. The truck includes an elevatable upright and fork carriage assembly 16 mounted from the forward end, an operator's station 18, and a pair of dirigible wheels 20 and 22 steered by an operator's steering wheel 24 and supporting, along with the steering mechanism of my invention, a steering axle 26 which is shown in FIG. 4 as being relatively massive for the purpose of providing in such a vehicle a non-deformable rigid structure as well as counterweight. The steer axle is secured to the truck frame by a central longitudinal plate member, a portion of which is shown at 28, and by a pair of tubular sleeve members 30 welded to an arcuate section 31 of the axle and to side frame members of the truck.

The wheels 20 and 22 are mounted suitably for rotation both about horizontal and vertical axes on a pair of yokes 32 which are secured to a pair of king posts 34 extending through sleeves 30 and mounted suitably on bearings therein, the king posts terminating in reduced diameter upper ends 36.

Figure 5:
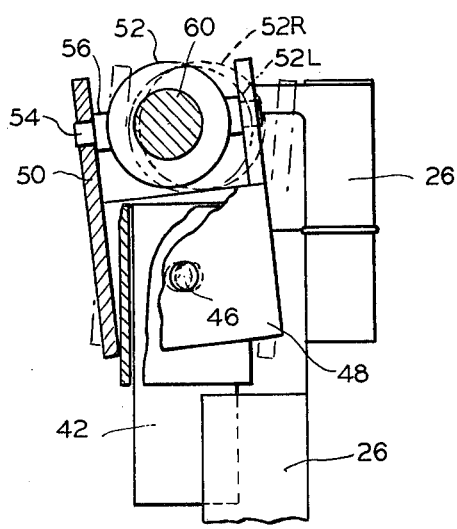
FIG. 5 is a sectional view taken along line 5—5 of FIG. 4.

Mounted centrally of the axle in a recess 38 and secured as by welding in the axle at 40 is a support post 42 upon which is mounted a tubular member 44 which is rotatable about the vertical axis of post 42 and to which is secured a pair of transversely extending stub shafts 46 on which are mounted for articulation a pair of laterally spaced vertical plates 48 which are secured to a pair of longitudinally spaced vertical plates 50 between which is mounted for articulation in a vertical plane on a pair of pivot pins 54 a double-acting hydraulic steer cylinder 52. Boss members 56 are mounted on pins 54 and are secured centrally of and to the front and rear sides of the cylinder. Plate members 50 are mounted so that a substantial clearance is present between the plates 50 and the tubular member 44, as shown, so that fore and aft movement of the cylinder can be effected, as best shown in FIG. 5.

It will now be apparent that the actuator cylinder 52 is mounted for universal movement in operation of the steering mechanism as may be required about any one or combination of three different axes, viz., twisting movement in a horizontal plane about the vertical axis of tube 44, articulation in a transverse vertical plane about the axis of pin 54, and fore and aft movement in a substantially horizontally plane about the axis of stub shafts 46. Thus, cylinder 52 is capable of continuous and inherently correct adjustment to accommodate the steering mechanism in and into any mode of steering on relatively smooth or rough surfaces, and from any steer angle to any other, while minimizing off center forces or thrust in any mode of steering, as will become apparent as the description proceeds.

Cylinder 52 contains a piston head mounted centrally of piston rod portions 60 and 62 which extend from both ends of the cylinder, the cylinder being connected to a steering pump and control circuit, not shown, which is activated by the operator's wheel 24 in known manner. As will be apparent, pressure fluid entering one or the other ends of the cylinder casing will actuate the piston and rod to a selected right or left hand steer position as the steer wheels 20 and 22 are actuated by linkage to be described, cylinder and rod structure combining the functions of an actuator and tie rod of conventional steering arrangements and effecting in combination with the remainder of the steering mechanism to be described in a number of significant advances over the prior art.

A significantly modified four-bar linkage is operatively connected to each end of the piston rod, to each of the steer wheels, and to the frame. Right-hand linkage 64 comprises a guide link 66 mounted pivotally at one end at 68 from the steer axle by a post 69 and pivotally at the opposite end at numeral 70 between the ends of a rigid extended intermediate link 72 which is pivotably connected at its outer end 74 to a steering arm 76 mounted at its opposite end to king post 36 for turning wheel 20. An inwardly extending portion 78 of link 72 is connected pivotally to a bifurcated end of piston rod 60 at 80.

The linkage parts which connect the piston rod portion 62 to king post 36 at wheel 22 are of the same design as and in allochiral relationship to the parts of linkage 64, and the parts thereof have been identified by the same numerals with a prime designation.

Figure 2:
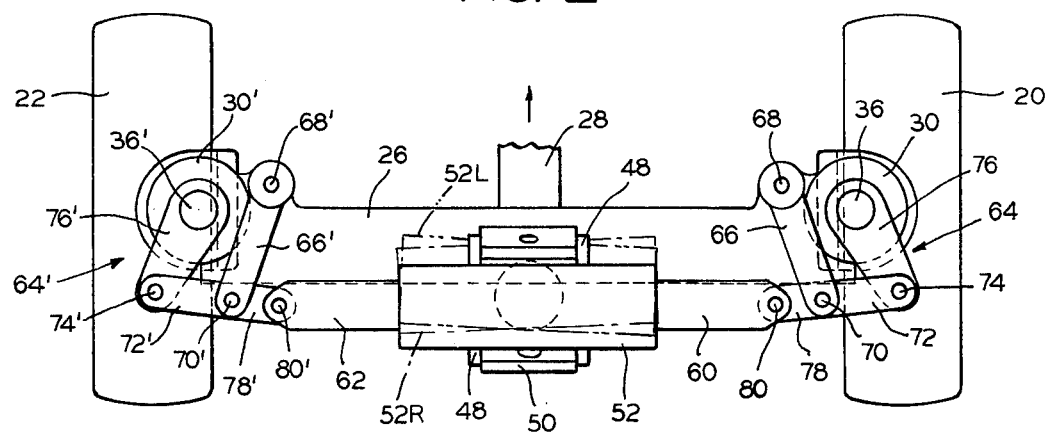
FIG. 2 is a plan view of my steering mechanism shown in a straight-ahead position and associated with the rear wheels of the lift truck in FIG. 1.

FIG. 6 illustrates diagrammatically my steering mechanism with the steer wheels being represented in three different positions, viz., the straight-ahead position as represented by the solid lines, the elements of which are numbered the same as in FIG. 2, the parts of the mechanism in a full right turn position (which is full left cramp in rear wheeled steering) being represented by dotted lines and carrying the same numerical designations with the addition of the letter "R," and the parts of the mechanism shown in a full left turn position (full right cramp in rear wheel steering) being illustrated in broken lines, the numerical designation of the parts being the same with the addition of the letter "L." An outline of the wheels 20 and 22 is illustrated in straight-ahead position and the center lines thereof are shown in full right turn position at numerals 20R and 22R, and in full left turn position at numerals 20L and 22L. The angles of turn of each wheel in both right and left turn positions are illustrated, it being noted that an exemplary embodiment of an actual design is shown in FIG. 6; it illustrates a full 180° turning capability of each wheel from one full cramp position to the opposite full cramp position.

If the tread and/or wheel base varies in any vehicle for which my invention is designed the length of the various steering links and of the actuator will, of course, be changed to meet the design requirements. If the wheel base to tread ratio remains constant as between any vehicles then the ratios of the various link lengths and of the actuator cylinders in steering mechanisms designed for such vehicles will remain substantially the same as shown in FIG. 6, for example, other factors remaining constant. If, however, the wheel base to tread ratio changes as compared with that used in designing the mechanism of FIG. 6, for example, then the ratios of the link lengths of the steering mechanism will change, all as will be apparent to persons skilled in the art. In addition, if there is a required variation in the length of any one or more links from that shown in exemplary FIG. 6, for example, which may result from such factors as a variation in force output requirement of the actuator and/or different space limitations or available configurations from that disclosed, then the ratios of the link lengths will vary as a function of the change in length of any given one link. This is by way of generalized exemplary design variation criteria which will be readily understood by any person skilled in the art following his awareness of the design concept herein disclosed.

Outstanding and much improved geometric design accuracy and efficiency is achieved in the use of my invention, plus additional attendant advantages which are derived primarily from the use of the extensions 78 and 78' of intermediate extended guide links 72 and 72', and also from the manner of mounting cylinder 52 in relation to the steer axle. Although the use of my steering mechanism effects the greatest degree of improvement over the prior art in a four wheeled vehicle which requires 180° of steer wheel turning capability, it is also of most significant advantage in such vehicles which may require substantially less than 180° of such capability. The extent of advantage derived in the use of my invention decreases as the steer angle requirement decreases substantially below 180°, but nonetheless advantages over the prior art persist through lesser steer angle requirements. The significance of the invention is however, best represented in a design as shown in the embodiment herein disclosed which utilizes 180° total steer angle capability.

On standard four-bar steer linkage design it will be understood that pivots 70 and 80, viewing the right-hand rear wheel, are combined as a single pivot, there being no rigid extension 78 in the link. Only the one side of the linkage is discussed below for the present purpose, but it will be understood, of course, that the same applies to the opposite side linkage as well. As will be particularly apparent in FIG. 6, if piston rod 60 were connected at pivot 70 instead of at pivot 80 by eliminating extension 78, the moment arm for turning the wheel would rapidly decrease as a full right wheel turn position is approached. Prior four-bar steering linkage designs have utilized such a structure so that the turning arm moment becomes very small at high steer angles necessitating, among other things, heavier steering linkage parts, a larger hydraulic actuator, more space for assembly of the steering mechanism, and the like, as will be described in greater detail below. The use of an extension link portion 78 effects a significantly longer moment arm at all steer angles to both full cramp positions, as will be apparent from a consideration of the full cramp positions of the linkages of both the right and left rear steer wheels as illustrated most graphically in FIG. 6, and as illustrated best pictorially in comparing the straight-ahead position of FIG. 2 with the left full cramp position (right hand turn) of FIG. 3.

The extension links 78 and 78' enable a steering linkage which produces almost perfect steering geometry not heretofore obtainable, particularly in high angle steering such as 180° center point steering for which the preferred embodiment as disclosed is designed. It has not been possible heretofore to provide both 180° total wheel swing in four-bar linkage steering devices for a pair of steer wheels combined with the degree of accuracy in steering geometry and relatively low and uniform actuator forces present in my invention.

Figure 3:
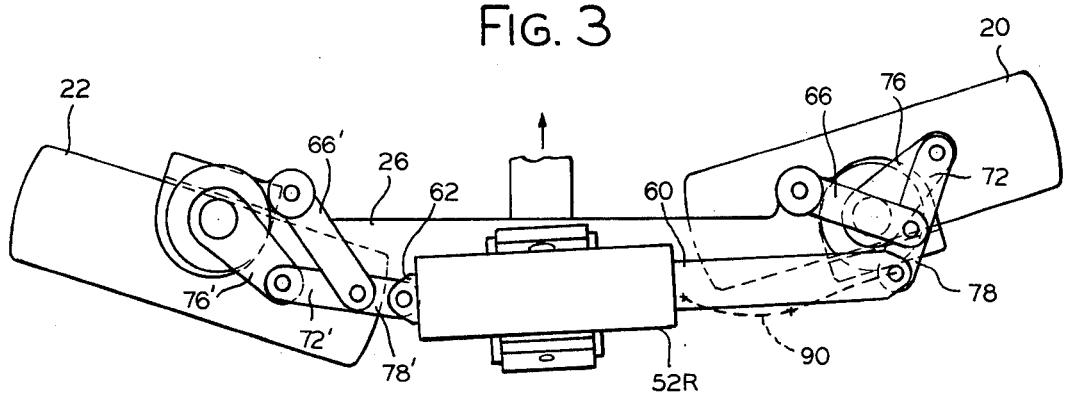
FIG. 3 is similar to FIG. 2 but shows the device actuated to locate the rear steer wheels in a full left cramp turn position for maximum right turn angle.

Certain of the dependent claims herein define geometric relationships of certain elements of the steering linkage, such as the direction of the intermediate link at a maximum cramp angle, the relationship of the guide link and the steering arm and the position of the steering arm both at 0° steer angle and at said maximum cramp angle, and the relationship of the guide link and the intermediate link at said cramp angle, all of which relationships may be best viewed in the showing of the steering elements of the right hand wheel in maximum cramp angle position in FIG. 3.

In FIG. 6 numeral 90 denotes the path of movement of pivot 80 from one full cramp position to the opposite such position, it being particularly important to note the relatively small lateral and longitudinal distance traversed which translates in the device as combined twisting and longitudinal movement during such 180° of movement of wheel 20, such twisting and longitudinal movement being effected about pivot tube 44 and pivot shafts 46. The maximum and total movement of actuator cylinder 52 is represented best in FIG. 2 by the single and double broken line positions thereof which are superimposed on cylinder 52 at numerals 52R and 52L. The various positions of the cylinder and yoke may also be seen in the side sectional view of FIG. 5, the positions of the cylinder, yoke, and pivot 46 being identified by the usual designations for straight-ahead, and left and right turn positions. It will be noted that the right and left full turn positions of cylinder 52, yoke 50 and pivot shaft 46 are included in the section of FIG. 5 in single and double broken lines, the same as in FIG. 2.

Figure 7:
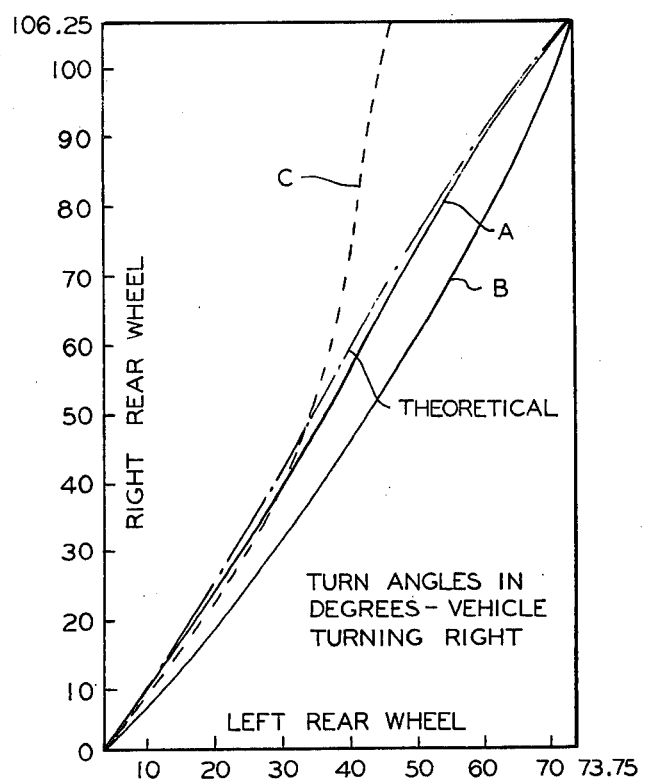
FIG. 7 is a chart which compares the steering geometry of the present invention and of a typical standard four-bar steering linkage with a theoretically ideal geometry.

FIG. 7 is a comparative graphical showing of the turn angles of the left and right-hand wheels during right-hand steering movement of the vehicle from straight-ahead to a full cramp wheel position. The broken line illustrates theoretically perfect differential wheel angle steering characteristic. The differential steering characteristic of my device is represented by Curve A, whereas a typical conventional such characteristic is illustrated by Curve B. Curve C represents the characteristic which would result if my four-bar linkage design were to be used without the extension 78 and 78' of links 72 and 72'. That is, it assumes the same design as disclosed except that the piston rod ends are connected at 70 and 70', not at 80 and 80'. The major deviation from ideal steering geometry resulting in apparent, although, of course, such a design would not be used in practice.

The FIG. 8 chart shows comparative results of actuator force output requirements as between full left and full right cramp positions for each of the steering mechanisms represented by the characteristic Curves A, B, C and Theoretical of FIG. 7. The numerical force figures are expressed in absolute units which, depending upon the particular embodiment and vehicle size may, of course, vary greatly as to measured force output required, but the ratios of absolute units will remain the same as between the steering mechanisms represented by the characteristics of the A, B, C and Theoretical curves illustrated.

The significance of the unit force differences to actuate the wheels between full cramp positions for the steering mechanisms represented by the A and B characteristic curves are apparent. It will be noted that the total actuator force difference required is substantially more than 2:1 as between a typical conventional four-bar linkage and the present invention. In addition it will be noted that the actuator force required for my design A remains far more nearly constant during actuation to a full turn position than does the force required to actuate the conventional design of Curve B. That is, it will be noted that my design requires at the right rear steer wheel a force of 1.45 units in full right cramp and 1.50 force units in full left cramp, as compared with 1.94 force units in full left cramp and 5.13 force units in full right cramp for the exemplary conventional linkage. The closeness of the force unit requirements of my design to those of a theoretically perfect design, which would have uniform constant unit force output throughout the full range of steering, are apparent.

Thus, in addition to much improved steering geometry as effected by my invention, the relative consistancy and lower force output requirements make it possible to use a substantially smaller diameter actuator cylinder than heretofore for any given maximum hydraulic pressure inasmuch as the actuator size is determined by the peak force requirement, and not by an average force requirement. The peak force requirement of design B, as shown in FIG. 8 at full left cramp, is more than three times the peak force requirement of this invention. In other words, the effective moment arm for turning the steering wheels remains relatively constant in my design, whereas with conventional four-bar steering mechanisms the moment arm approaches a very small value at maximum cramp angle in 180° steering mechanisms. Therefore, in addition to the available use of smaller actuator cylinders, a significantly lighter design of steering linkage may be used because the steering linkage also is designed to resist peak force, not average force. The results are included for the design which produces Curve C in FIG. 7 as a matter of information.

Furthermore, the relatively small fore and aft movement of pivots 80 and 80' through the full range of steering, as illustrated for pivot 80 by curve 90 in FIG. 6, permits the tie rod 60, 62 to be used also as a piston rod of the actuating cylinder 52 which in turn supports the cylinder in a manner which virtually eliminates off-center thrust or reaction forces which would otherwise increase friction and wear at the cylinder packings. In other words, if the tie rod and actuator were separate, misaligning forces are induced either on the cylinder or on the tie rod or both which increases off-center thrust forces.

Yet additionally, a significant saving in space for installation of the steering assembly may be realized. Adequate space for conventional four-bar steering may not be available in certain vehicle designs. The space saving is, of course, realized by the combination of structure which effects a reduction of actuator cylinder size, a combination of tie rod and actuator as a cylinder and piston rod assembly which moves a relatively small distance fore and aft in operation, and a lighter or less bulky steering linkage design.

Although I have described and illustrated a preferred embodiment of my invention, it will be understood by those skilled in the art that modifications may be made in the structure, form and relative arrangement of parts without necessarily departing from the spirit and scope of the invention. For example, the embodiment disclosed herein is particularly adapted to rear wheel steering in a specific type of industrial lift truck in which space for installation of the steering mechanism is at a premium and in which my invention is of particular advantage for all of the above described reasons, including the combining of the actuator and tie rod as the hydraulic cylinder and piston rod structure. Of course, the invention may be found applicable to many vehicular types, at least some of which do not require and may not prefer the combination of actuator and tie rod as herein disclosed. The "tie rod means," as is set forth in some of the claims below, should not be interpreted, therefore, as in any sense being limited to the type disclosed herein, but may be any type of known tie rod with or without any type of combined actuator means.

In addition, as a further example, the particular application disclosed herein for the lift truck design contemplated has made it advantageous to combine a steering axle and a generally inverted U-shaped steering mechanism having an actuator cylinder mounted for pivotal movement about different axes and above the steer axle. This structure is peculiar to certain vehicular types, such as the lift truck which is disclosed in the preferred embodiment, and is so claimed in some of the claims below. It is not, however, in any way essential to the broader aspects of the invention in relation to the four-bar linkage per se, such as is claimed in claim 1 below. On the other hand, the design of my improved four-bar steering linkage is not essential to the practice of my invention of the novel mounting structure of the cylinder actuator and inverted U-shaped steering assembly in relation to the steer axle, as also claimed below. In other words, there are various important aspects of this invention which must be considered independently of other aspects, as well as in combination therewith, when considering the claims hereof. Accordingly, it should be understood that I intend to cover by the appended claims all such modifications which fall within the scope of my invention.

I claim:

1. A steering mechanism for wheeled vehicles having right and left steer wheels comprising a modified four-bar steer linkage operatively connected to each said wheel, and tie rod means connected to both said four-bar linkages for actuating said linkages and wheels to steer the vehicle in either direction, each of said linkages comprising an intermediate steering link, a steering arm connected at one end pivotably to said link, pivot means connected rigidly to the opposite end of said steering arm and connected to the adjacent wheel for steering the wheel, a guide link connected at one end pivotably to said intermediate link and a relatively fixed member to which the opposite end of said guide link is pivotably connected, said intermediate link including a rigid extension which extends a predetermined distance inwardly beyond the connection thereto of said guide link, said tie rod means being connected pivotably at each end thereof to an adjacent inner end of the rigid extension of the respective intermediate link.

2. A steering mechanism as claimed in claim 1 wherein said tie rod means comprises a hydraulic cylinder, a piston and a piston rod extending through both ends of the cylinder for connection at its opposite ends to the respective inner ends of said rigid extensions.

3. A steering mechanism as claimed in claim 2 wherein said pivot means is mounted in a bearing housing, a steer axle secured to a laterally spaced pair of said bearing housings, and means connected said hydraulic cylinder to the steering axle including a member rotatable about a vertical axis and other pivot means supported from said rotatable member permitting pivotal movement of the cylinder and piston rod about a horizontal axis.

4. A steering mechanism as claimed in claim 3 wherein said tie rod means and steer linkages are supported above said steer axle, said hydraulic cylinder connected means providing for simultaneous twisting of the cylinder in a horizontal plane, and forward and rearward movement thereof during changes in steering angle at the wheels.

5. A steering mechanism as claimed in claim 4 wherein additional pivot means is connected to said cylinder permitting pivotal movement of the cylinder and piston rod about a second horizontal axis.

6. A steering mechanism as claimed in claim 2 wherein said cylinder and piston rod are supported from said four-bar linkages, a yoke connected to opposite sides of the cylinder depending downwardly therefrom, means connected to the yoke permitting pivotal movement of the cylinder about a horizontal axis, and tubular means connected to said yoke connected means for rotation about a vertical axis, whereby during changes in steering angle said cylinder and piston rod are movable about said axes to effect forward, rearward and horizontal twisting movements.

7. A steering mechanism as claimed in claim 6 wherein a steer axle having a vertically extending post member extends longitudinally of and beneath the cylinder and piston rod, said tubular means being rotatable on said post member.

8. A steering mechanism as claimed in claim 7 wherein said vertical post member is mounted in a recess located in the steer axle.

9. A steering mechanism as claimed in claim 6 wherein pivot means connects said yoke to said opposite sides of the cylinder permitting additional pivotal movement of the cylinder about a second horizontal axis substantially transverse to the first mentioned horizontal axis.

10. A steering mechanism as claimed in claim 2 wherein said extension of said intermediate link maintains with the intermediate link a sufficient turning moment arm at the steer wheels in a high angle steering mechanism for producing a relatively small force variation requirement of the cylinder and piston rod from one full wheel cramp position to the opposite full wheel cramp position, whereby to enable the use of a relatively small diameter cylinder.

11. A steering mechanism as claimed in claim 2 wherein said hydraulic cylinder and piston rod are mounted pivotally for both forward, rearward and twisting movements about substantially horizontal and vertical axes during steer angle changes, a maximum steer angle change effecting relatively little fore and aft movement of said pivotal connections of said piston rod to the inner ends of the extensions of said intermediate links, whereby to minimize the eccentric thrusts on the hydraulic cylinder.

12. A steering mechanism as claimed in claim 1 wherein said relatively fixed member is said steer axle, said steer axle being connected to a housing for said pivot means.

13. A steering mechanism as claimed in claim 1 wherein the rigid extension of said intermediate link combined with predetermined angular relationships and lengths of the steering arm and links of each of said modified four-bar linkages enables the four-bar linkages and tie rod means to effect substantially 180° total steer angle for each steer wheel between opposite full cramp positions thereof combined with substantially ideal differential steering geometry.

14. A steering mechanism as claimed in claim 13 wherein said four-bar linkages including said rigid extension of said intermediate link provides a substantial steering moment arm at both wheels at full cramp positions thereof.

15. A steering mechanism as claimed in claim 13 wherein each steer wheel is capable of being actuated by said tie rod means and four-bar linkages from 0° steering angle to substantially 73° in one direction and to substantially 106° in the opposite direction.

16. A steering mechanism as claimed in claim 13 wherein a pair of non-steer wheels are spaced longitudinally from said steer wheels, and at a full cramp steering angle the vehicle is steered about a center which is located substantially at the intersection of the longitudinal axis of the vehicle and of the axis of said non-steer wheels.

17. A steering mechanism for wheeled vehicles having right and left steer wheels comprising a modified four-bar steer linkage operatively connected to each said wheel, and tie rod means connected to both said four-bar linkages for actuating said linkages and wheels to steer the vehicle in either direction, each of said linkages in a straight-ahead steering position comprising an intermediate steering link which extends generally laterally inwardly of the vehicle, a steering arm connected at one end pivotably to an outer end of said steering link, pivot means connected rigidly to the opposite end of said steering arm and connected to the adjacent wheel for steering the wheel, a guide link connected at one end pivotably to said intermediate link inwardly of the connection thereto of said steering arm and a relatively fixed member to which the opposite end of said guide link is pivotably connected, said intermediate link including a rigid extension which extends a predetermined distance inwardly of the vehicle beyond the connection thereto of said guide link, said tie rod means being connected pivotably at each end thereof to an adjacent inner end of the rigid extension of the respective intermediate link.

18. A steering mechanism as claimed in claim 17 wherein at a maximum cramp angle of a steer wheel the operative intermediate link and rigid extension thereof extends in a direction primarily longitudinal of the vehicle while maintaining with said tie rod means a substantial wheel turning moment.

19. A steering mechanism as claimed in claim 18 wherein at said maximum cramp angle said guide link passes through the vertical plane of said steering arm, said steering arm having been actuated from a position extending generally in one direction of the vehicle at zero steer angle to a position extending generally in the opposite direction of the vehicle at said maximum cramp steer angle.

20. A steering mechanism as claimed in claim 18 wherein at said maximum cramp angle said guide link and intermediate link including said rigid extension are in generally T-shaped relationship in plan view.

* * * * *